(12) United States Patent
Kovach et al.

(10) Patent No.: US 7,743,844 B2
(45) Date of Patent: Jun. 29, 2010

(54) CROP RESIDUE AND SOIL CONDITIONING AGRICULTURAL IMPLEMENT

(75) Inventors: Michael G. Kovach, Morton, IL (US);
Garry Good, Bloomington, IL (US);
Michael R. Newman, Sullivan, IL (US);
Kai Zhao, Willowbrook, IL (US);
Suresh Pai, Naperville, IL (US)

(73) Assignee: CNH America LLC, Racine, WI (US)

( * ) Notice: Subject to any disclaimer, the term of this patent is extended or adjusted under 35 U.S.C. 154(b) by 0 days.

(21) Appl. No.: 11/781,312

(22) Filed: Jul. 23, 2007

(65) Prior Publication Data

US 2009/0025946 A1 Jan. 29, 2009

(51) Int. Cl.
*A01B 61/00* (2006.01)

(52) U.S. Cl. ............... 172/261; 172/500; 172/572; 172/799; 172/264

(58) Field of Classification Search .......... 172/255, 172/261, 264, 265, 314, 551, 558–572, 576, 172/579, 583, 599–601, 55, 260.5, 263, 266–271, 172/315, 317–320, 397, 398, 452, 454, 455, 172/462, 497–500, 595–597, 482
See application file for complete search history.

(56) References Cited

U.S. PATENT DOCUMENTS

| | | | | |
|---|---|---|---|---|
| 358,838 A * | 3/1887 | Chandler | .................. | 172/568 |
| 442,050 A | 12/1890 | Howard | | |
| 495,051 A | 4/1893 | Millar | | |
| 621,865 A * | 3/1899 | Smith | .................. | 172/513 |
| 638,514 A * | 12/1899 | Hunt et al. | .................. | 172/572 |
| 1,007,496 A | 10/1911 | Sharp | | |
| 1,117,728 A | 11/1914 | Ward | | |
| 1,239,091 A | 9/1917 | Dickinson | | |
| 1,335,410 A * | 3/1920 | Twistern | .................. | 172/551 |
| 1,712,815 A * | 5/1929 | Dwyer | .................. | 172/572 |
| 2,266,590 A | 12/1941 | Dyrr | | |
| 2,760,424 A * | 8/1956 | Cooper | .................. | 172/561 |
| 3,223,178 A | 12/1965 | Clifford et al. | | |
| 3,454,106 A * | 7/1969 | Youngberg et al. | .......... | 172/595 |
| 3,620,310 A * | 11/1971 | Richey | .................. | 172/600 |
| 3,845,825 A * | 11/1974 | Boone et al. | .................. | 172/158 |
| 4,066,132 A * | 1/1978 | Rehn | .................. | 172/572 |
| 4,407,372 A | 10/1983 | Rozeboom | | |
| 4,422,512 A | 12/1983 | Hodgson, Jr. et al. | | |
| 4,546,832 A * | 10/1985 | Dietrich et al. | .......... | 172/260.5 |
| 4,724,910 A * | 2/1988 | Wheeler | .................. | 172/464 |
| 6,109,814 A | 8/2000 | Cox et al. | | |
| 6,223,832 B1 * | 5/2001 | Hook et al. | .................. | 172/565 |
| 6,276,462 B1 * | 8/2001 | Dietrich, Sr. | .................. | 172/138 |
| 6,612,381 B2 | 9/2003 | Powell et al. | | |

(Continued)

*Primary Examiner*—Robert E Pezzuto
*Assistant Examiner*—Matthew D Troutman
(74) *Attorney, Agent, or Firm*—Rebecca Henkel

(57) ABSTRACT

A disc harrow composed of one or more disc gangs has a subframe coupled to the disc gangs to move the disc gangs in response to variations in farmland terrain to limit the impact of obstructions when encountered during the harrowing process. When the obstruction is cleared, the subframe automatically returns the disc gangs to their pre-obstruction position. In addition to reducing the potentially-damaging impact of obstructions, the subframe also maintains a more consistent reel depth during undulations or changes in the farmland terrain, such as during harrowing of slopes or unleveled fields such as valleys, near waterways, and along fence rows.

11 Claims, 5 Drawing Sheets

U.S. PATENT DOCUMENTS

| | | | |
|---|---|---|---|
| 6,691,629 B2 * | 2/2004 | Paluch et al. | 111/56 |
| 6,695,069 B2 * | 2/2004 | Rozendaal | 172/601 |
| 7,131,501 B1 | 11/2006 | Svendsen et al. | |
| 2003/0164125 A1 * | 9/2003 | Paluch et al. | 111/56 |

* cited by examiner

CROP RESIDUE AND SOIL CONDITIONING AGRICULTURAL IMPLEMENT

FIELD OF THE INVENTION

The present invention relates generally to agricultural implements, and in particular, to an implement having a pivoting mechanism to which a disc gang is mounted that changes the elevation of the disc gang is response to variations in terrain contours.

BACKGROUND OF THE INVENTION

Once a crop has been harvested, residual crop materials frequently remain on the farmland surface. Typically, these residual crop materials are incorporated within the soil profile of the farmland in an effort to maintain soil nutrient integrity. For example, management of corn cropped fields commonly includes the incorporation of the residual corn stalks with field soil once the corn, and occasionally a portion of the stalk, has been harvested. Whereas some growers harvest a majority of the kernel, cob, and stalk material, others harvest only the kernel and discharge a majority of the chaff or cob and stalk materials onto the farmland. Regardless of the quantity of stalk material that is harvested, the subsequent preparation of the farmland requires incorporation of the stalk or crop residue with the field soil. It is generally understood that the size of the crop residue particles as well as the surface area of the crop residue exposed to the soil affects crop residue decomposition. Specifically, reduced crop residue particle size and increased surface contact of the crop residue with adjoining soil improves crop residue decomposition.

Frequently, a crop residue conditioner, such as a stalk chopper, is pulled across the harvested field during autumn. The stalk chopper cuts the remaining stalks into smaller, more easily workable and degradable sized pieces. Thereafter, a disc harrow is used to smooth and level the farmland or seedbed and till a portion of the crop residue with the soil. The disc harrow not only mixes the crop residue with the underlying soil to return nutrients to the soil but also can be used to establish a residue layer over the farmland to protect against erosion and provide moisture control during the winter months before replanting in the spring.

Disc harrows include one or more disc gangs, each including a series of steel discs or reels with tapered or beveled peripheral edges. The discs, although tending to roll or rotate as they are pulled forward, penetrate into and break up the soil and stalks and other crop residue. The soil and crop residue then ride along and across the concave surfaces so as to be turned or inverted. A portion of the residue is buried with this turning, with the percentage of buried residue increasing with the amount of soil turning. The amount of crop residue that is retained on the seedbed surface may also be controlled by setting the angle of attack or "gang angle", such as described in U.S. Pat. No. 6,612,381, the disclosure of which is incorporated herein by reference.

During harrowing of the farmland the disc harrow may encounter various obstructions, such as rocks, stumps, and roots. To reduce the impact of such obstructions and thereby potential damage to the disc harrow, the disc gangs are often resiliently supported on the harrow mainframe so that each gang can independently yield to the obstructions. Conventionally, the reels are mounted to a shaft or axle which is then mounted to the harrow mainframe via U-shaped or C-shaped spring members, also referred to as shanks or cushions. These spring members are designed to absorb the blunt forced placed on the disc gangs when the reels meet with an obstruction. However, these spring members are typically coupled to the mainframe and the gang shaft in a fixed connection, as illustrated in U.S. Pat. No. 4,066,132 to Rehn, U.S. Pat. No. 4,404,372 to Rozeboom, and U.S. Pat. No. 7,131,501 to Svendsen et al. As a result, when an obstruction is encountered during harrowing the springs will deflect to absorb some the impact of the obstruction, but the obstruction remains in the path of the harrow until forcibly cleared by the rotating reels or forcibly pulled over the obstruction by the tractor or other towing means. Moreover, once the spring has fully deflected, it cannot absorb any additional force placed on the disc gangs. As such, while such cushions have reduced wear to the disc gangs, their effectiveness is limited when larger farmland obstructions are encountered.

Thus, there remains a need for a farm implement having a shock absorbing assembly that not only absorbs the impact of an obstruction during the harrowing process, but also places less stress on the farm implement during clearing of the obstruction.

SUMMARY OF THE INVENTION

The present invention is directed to a disc harrow having a subframe resiliently mounted to one or more disc gangs and the disc harrow mainframe. The subframe is designed to allow the disc gangs to respond to variations in the farmland terrain to limit the impact of obstructions when encountered during the harrowing process. Specifically, the subframe automatically rises relative to the disc harrow mainframe when an obstruction is encountered thereby lifting the disc gangs over the obstruction. When the obstruction is cleared, the subframe automatically lowers to its previous position and thus also lowers the disc gangs. In addition to reducing the potentially-damaging impact of obstructions on the disc harrow and its components, the subframe also maintains a more consistent reel depth during undulations or changes in the farmland terrain, such as during harrowing of slopes or unleveled fields such as valleys, near waterways, and along fence rows. The disc harrow therefore provides more consistent and uniform soil clod sizes, cutting depth, and soil/residue mixing despite changes in farmland contour.

Therefore, in accordance with one aspect, the present invention is directed to a disc harrow having a mainframe and a subframe coupled to the main frame. The disc harrow further has a disc gang assembly coupled to the subframe and composed of a plurality of crop residue and soil tilling reels. A pivoting mechanism is coupled to the subframe and the mainframe, and is configured to move the disc gang assembly relative to the mainframe when an obstruction is encountered during harrowing of a farmland.

According to another aspect, the present invention includes a farm implement for tilling a farmland. The farm implement has a mainframe defined by a pair of rails and a subframe carrying a harrow and centrally positioned between the pair of rails. The farm implement further has a pivoting mechanism resiliently coupling the subframe to the mainframe. The pivoting mechanism automatically elevates the harrow relative to the mainframe when an obstruction is encountered.

In accordance with another aspect of the present invention, an apparatus for tilling crop residue and soil is presented. The apparatus has a disc harrow including a first disc gang and a second disc gang connected to the first disc gang by a floating frame. A mainframe is defined by a pair of rails and a plurality of transverse supports, and carries the disc harrow and is coupled to the floating frame by at least one cushion. The floating frame is centered relative to the pair of rails. The at least one cushion is adapted to maintain the disc harrow at a defined depth during normal working operation and automatically elevate the disc harrow relative to the mainframe when an obstruction is encountered during harrowing of a field.

Other objects, features, and advantages of the invention will become apparent to those skilled in the art from the following detailed description and accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Preferred exemplary embodiments of the invention are illustrated in the accompanying drawings in which like reference numerals represent like parts throughout.

In the drawings.

DETAILED DESCRIPTION OF THE PREFERRED EMBODIMENTS

Figure 1:
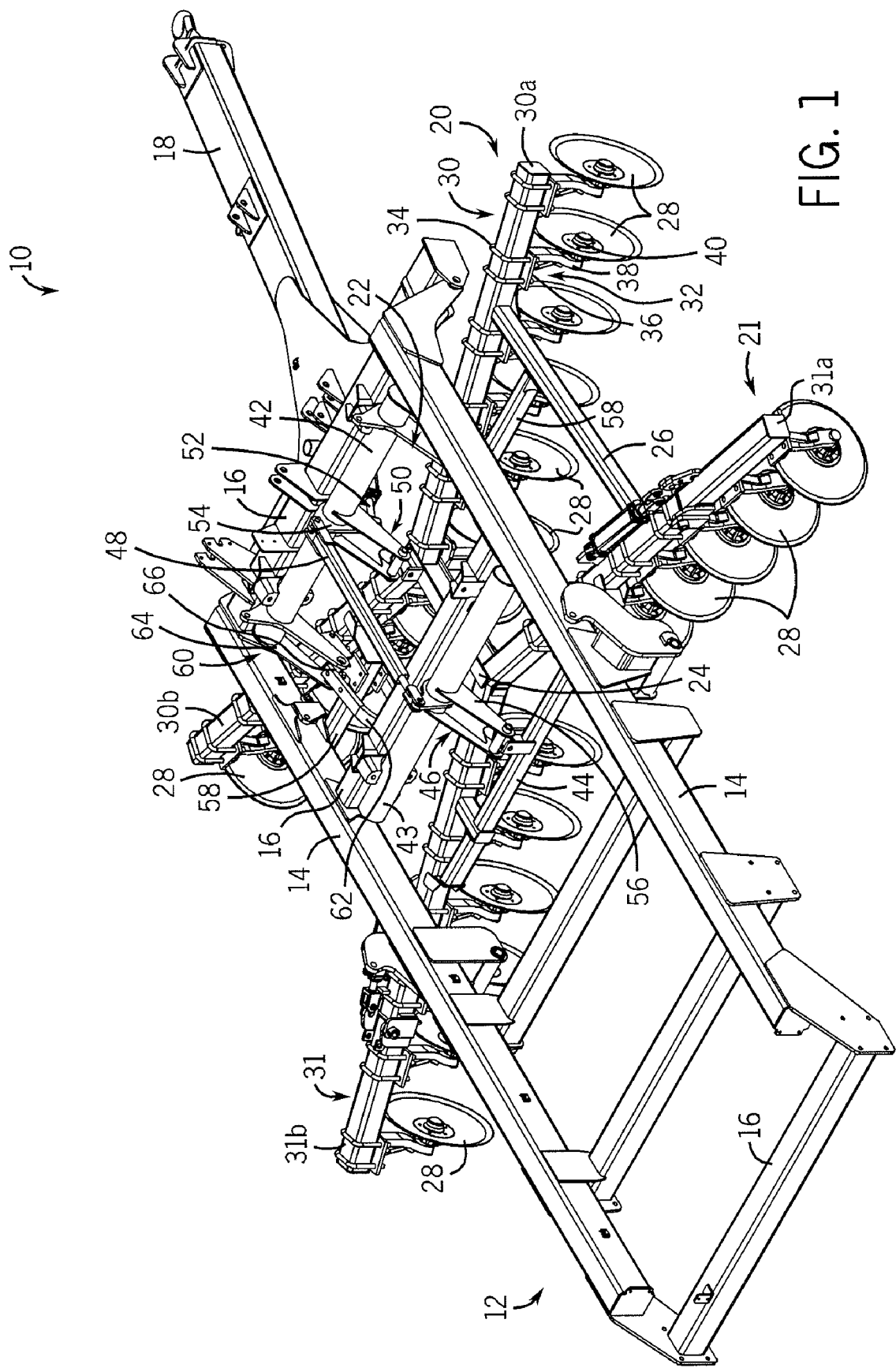
FIG. 1 is an isometric view of a disc harrow according to one aspect of the invention.

Referring now to FIG. 1, a disc harrow 10 has a mainframe 12 defined by a pair of rails 14 connected to one another by a series of transverse supports 16 spaced from one another along the length of the rails 14. The disc harrow 10 is designed to be towed by a tractor or other powered device. In this regard, the disc harrow 10 includes a hitch 18 for connecting the mainframe 12 to the tractor. In the illustrated embodiment, the disc harrow 10 includes a pair of disc gangs 20, 21 mounted to the mainframe 12 using a subframe 22, which will be described in greater detail below. The pair of disc gangs includes a forward disc gang, designated by numeral 20, and a rearward disc gang, designated by numeral 21.

The disc gangs 20, 21 are connected to one another by an I-beam 24 and a pair of gang braces 26, only one of which is visible in the figure. Each disc gang 20, 21 has a series of reels or discs 28 each of which is mounted to a disc support beam 30, 31, respectively, by a clamping device 32. In the illustrated example, each disc support beam 30, 31 has a pair of support arms 30a, 30b and 31a, 31b, respectively. The support arms are angled relative to one another in such a manner that disc support beam 30 is generally V-shaped whereas disc support beam 31 has a generally inverted V shape. Collectively, the pair of disc support beams 30, 31 when connected together by I-beam 24 have a generally H-shape. Each clamping device 32 includes a clamp 34 fastened to a clamp plate 36 having a downwardly extending arm 38 that connects to the hub 40 of each reel 28.

Figure 2:
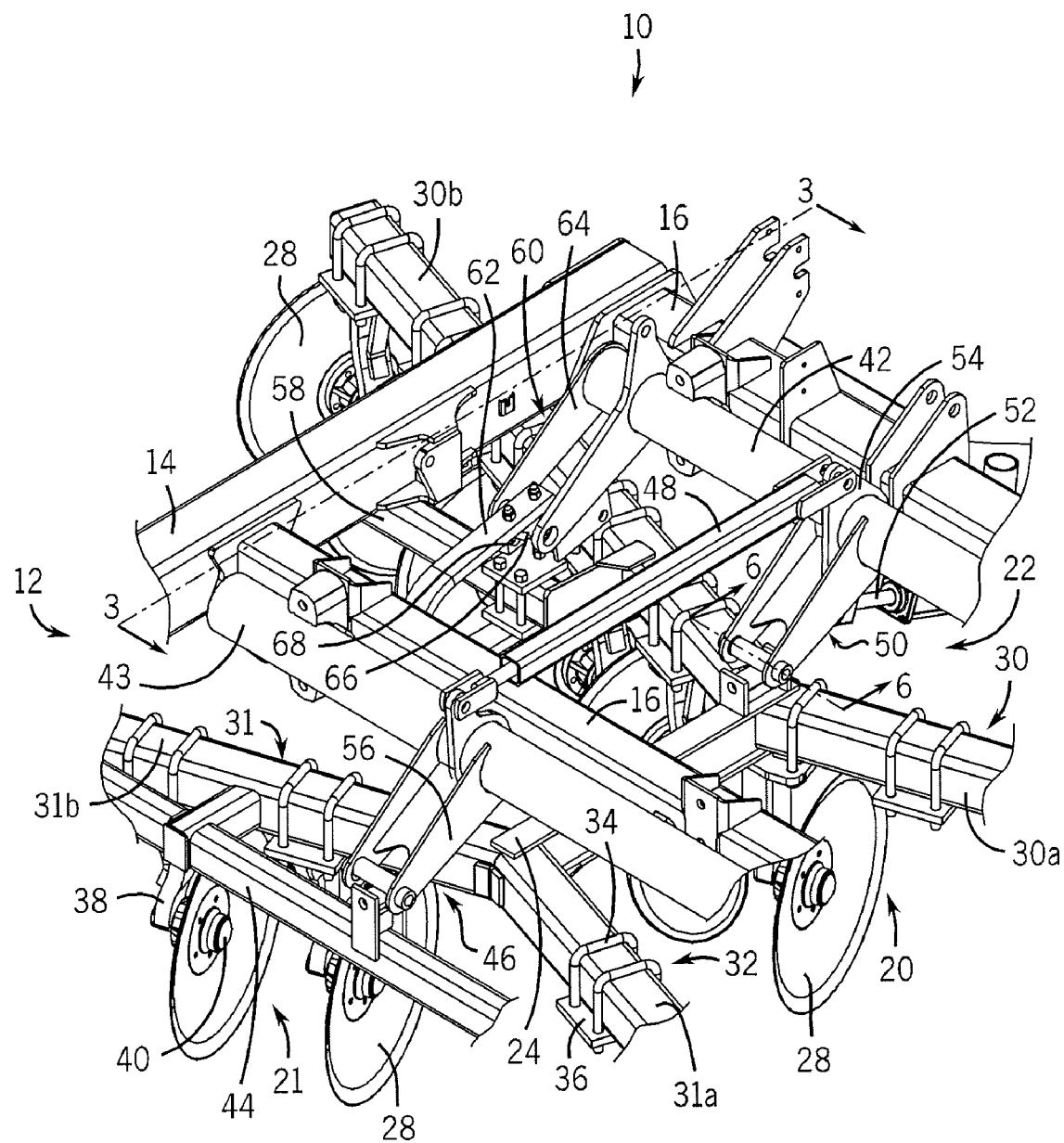
FIG. 2 is an isometric view of a portion of the disc harrow shown in FIG. 1.

With additional reference to FIG. 2, the subframe 22 has a forward pipe 42 and a rearward pipe 43 spaced from one another and coupled to respective transverse supports 16 using suitable connectors. The rearward pipe 43 is coupled to a cross brace 44 secured to the disc support beam 31 of the rearward disc gang 21. Cross brace 44, using a suitable connection, is coupled to each support arm 31a, 31b. Pipe 43 and cross brace 44 are coupled to one another with a bracket and hinge arrangement 46 that allows the height of the rearward disc support beam 31, and thus the rearward disc gang 21, to be adjusted. More particularly, rearward pipe 43 mechanically communicates with forward pipe 42 via piston 48 that is coupled to forward pipe 42. A bracket and hinge arrangement 50 is used to couple the forward pipe 42 to I-beam 24. The piston 48 is also connected to an actuator 52 via a lever 54 that is rotatable about forward pipe 42. In this regard, the actuator 52 may be energized to pull lever 54 forward to lower the forward disc gang 20 and the rearward disc gang 21 or push lever 54 rearward to raise the forward disc gang 20 and the rearward disc gang 21. When lowering the disc gangs 20, 21, the actuator 52 is activated so that lever 54 pushes piston 48 rearward, which causes lever 56 coupled to rearward pipe 43 to rotate downward, thereby resulting in the rearward disc gang 21 being lowered in concert with the forward disc gang 20. When raising the disc gangs 20, 21, the actuator 52 is activated so that lever 54 pulls piston 48 forward, which causes lever 56 coupled to rearward pipe 43 to rotate upward, thereby resulting in the rearward disc gang 21 being raised in concert with the forward disc gang 20. This construction allows the disc gangs 20, 21 to be positioned at an infinite number of heights defined between the rotational limits of levers 54, 56.

Figure 3:
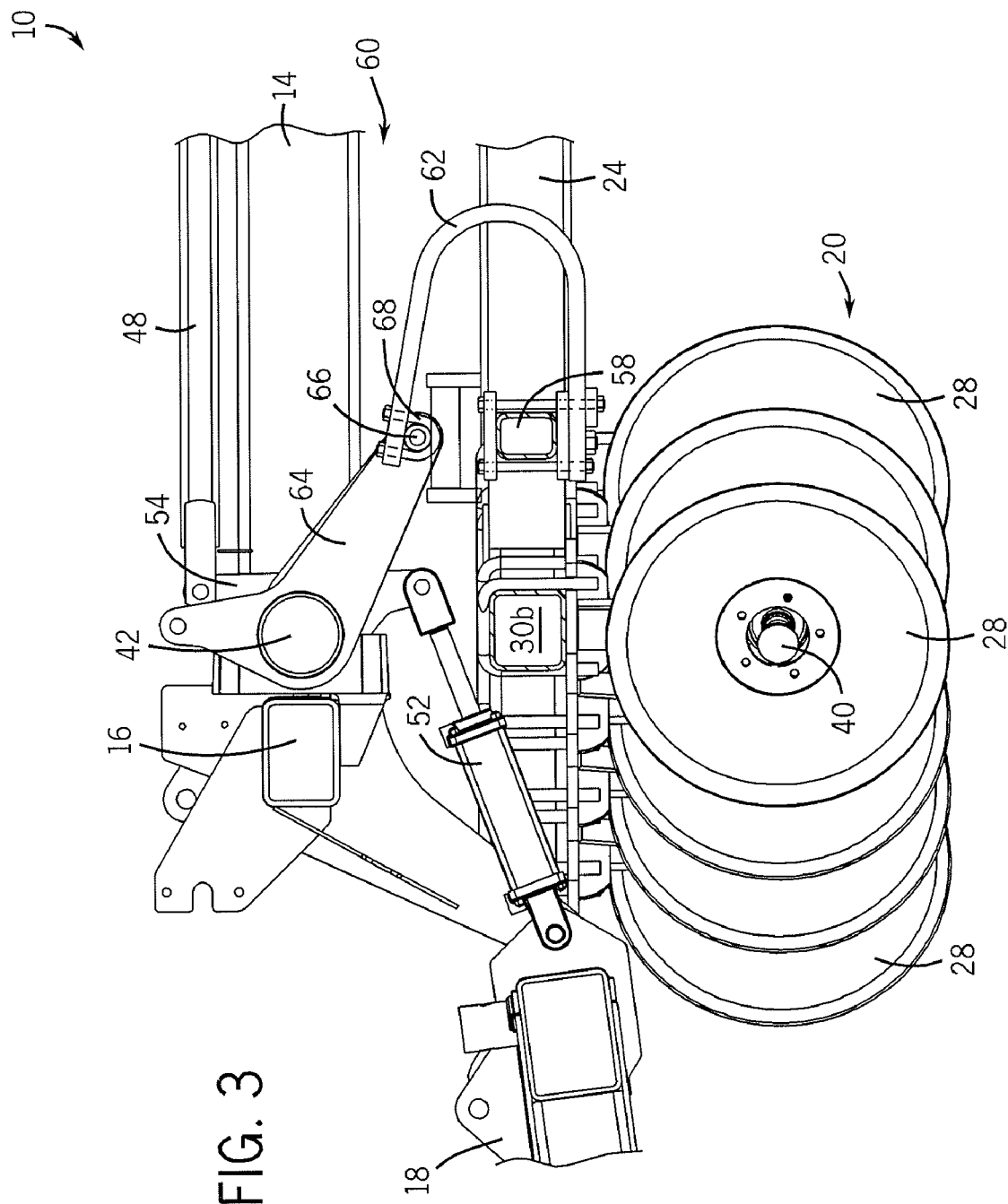
FIG. 3 is a section view taken along line 3-3 of FIG. 2.

The subframe 22 also includes a pair of lateral supports 58, one of which is bracketed to pipe 42 and the other of which is coupled to a pivoting mechanism 60. As further illustrated in FIG. 3, pivoting mechanism 60 includes a cushion 62, having a curved shape, coupled to a respective lateral support 58. The cushion 62 is coupled to a pipe, which in the illustrated example is forward pipe 42, by a bracket 64. Bracket 64 includes a pin 66 about which cushion 62 is secured by a clamp 68. This coupling allows the cushion 62 to rotate or otherwise pivot relative to bracket 64 when the disc gang 20 encounters an obstruction.

Figure 4:
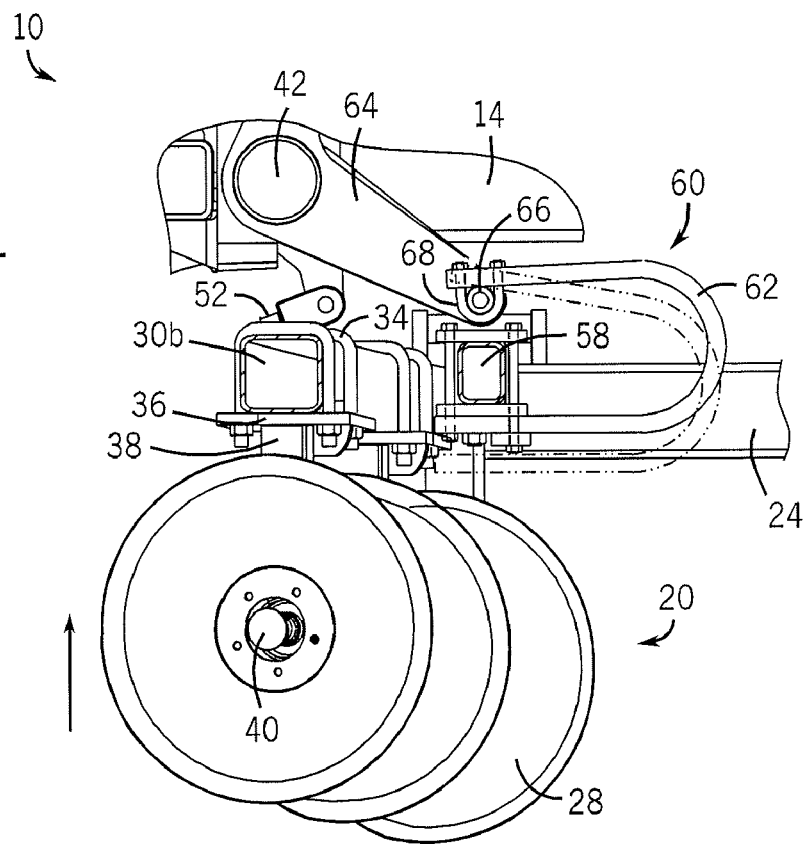
FIG. 4 is a section view similar to FIG. 3 showing movement of a disc gang from a normal working position to a clear-an-obstruction position.
Figure 5:
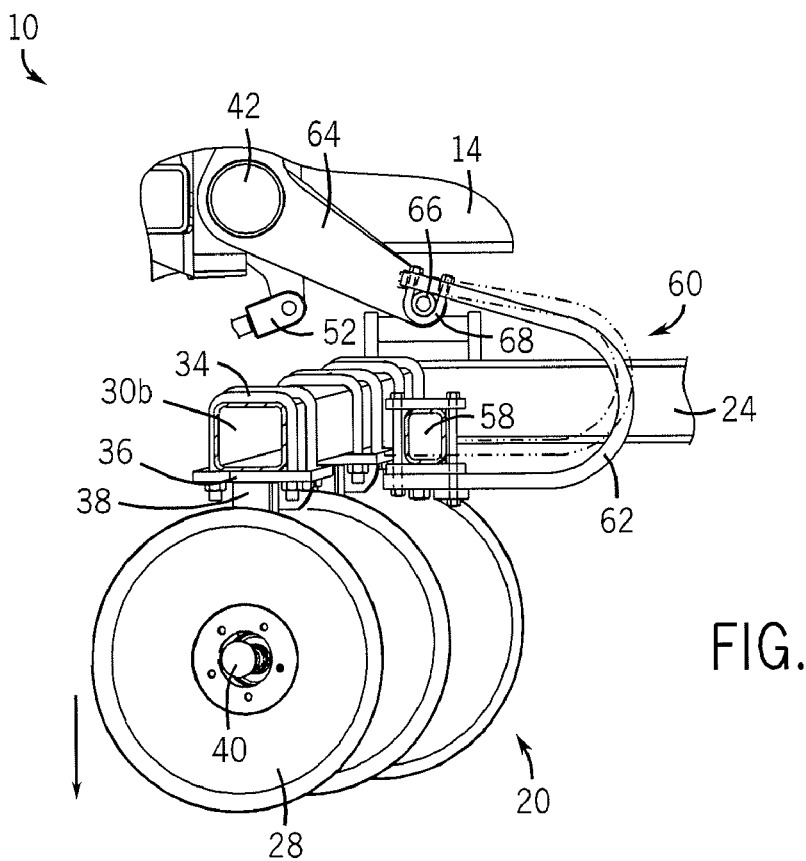
FIG. 5 is a section view similar to FIG. 4 showing movement of the disc gang back to the normal working position once an obstruction has been cleared.

The cushion 62 presents a spring load on lateral support 58 which is coupled to the disc gangs 20, 21 by brace 26. During unobstructed passage of the disc gangs 20, 21, the spring load maintains the depth of the disc gangs 20, 21 at a relatively constant level. When an obstruction is encountered, cushion 62 will deflect thereby absorbing the force imparted by the obstruction. When the force of impact exceeds the bias of the cushion 62, the cushion 62 will rotate about pin 66 thereby drawing the disc gangs 20, 21 upward relative to the mainframe 12, as shown in FIG. 4. In this regard, cushion 62 is designed to provide a two-stage response to impact with a larger obstruction. In the first stage, the cushion 62 deflects. In the second stage, the cushion 62 will draw the disc gangs 20, 21 upward relative to the mainframe 12 thereby drawings the disc gangs 20, 21 over and thereby clearing the obstruction. When the bias of the obstruction removed, i.e., the obstruction has been cleared, the spring bias of the cushion 62 is restored, the cushion rotates downwardly relative to pin 66, as shown in FIG. 5, and returns the disc gangs 20, 21 to their normal working depth.

Figure 6:
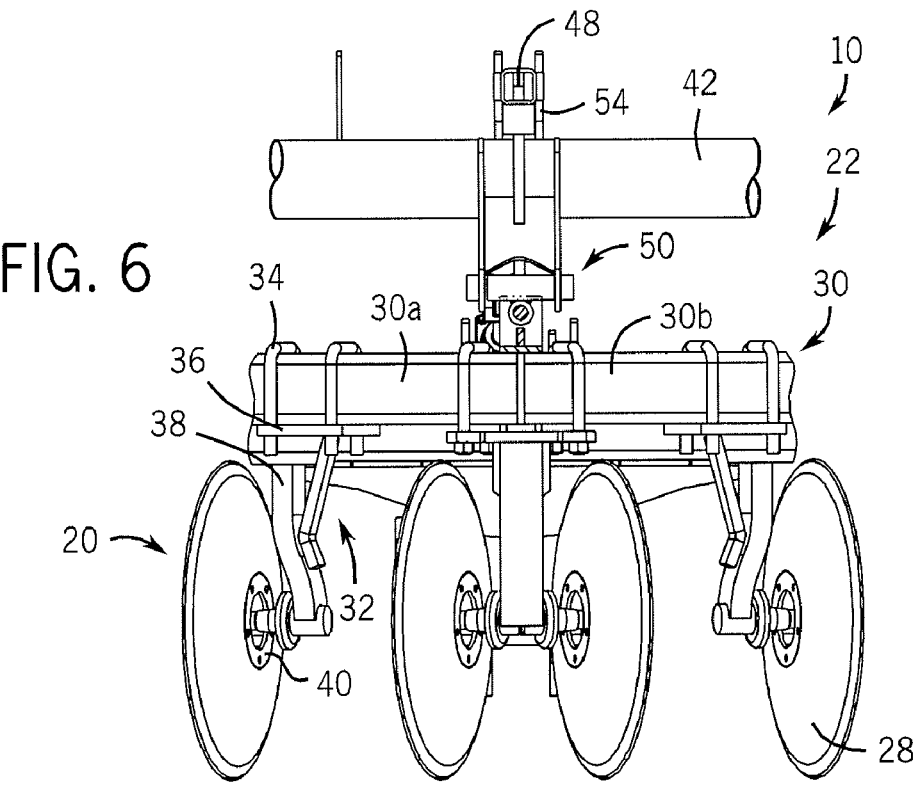
FIG. 6 is a section view taken along line 6-6 of FIG. 2.
Figure 7:
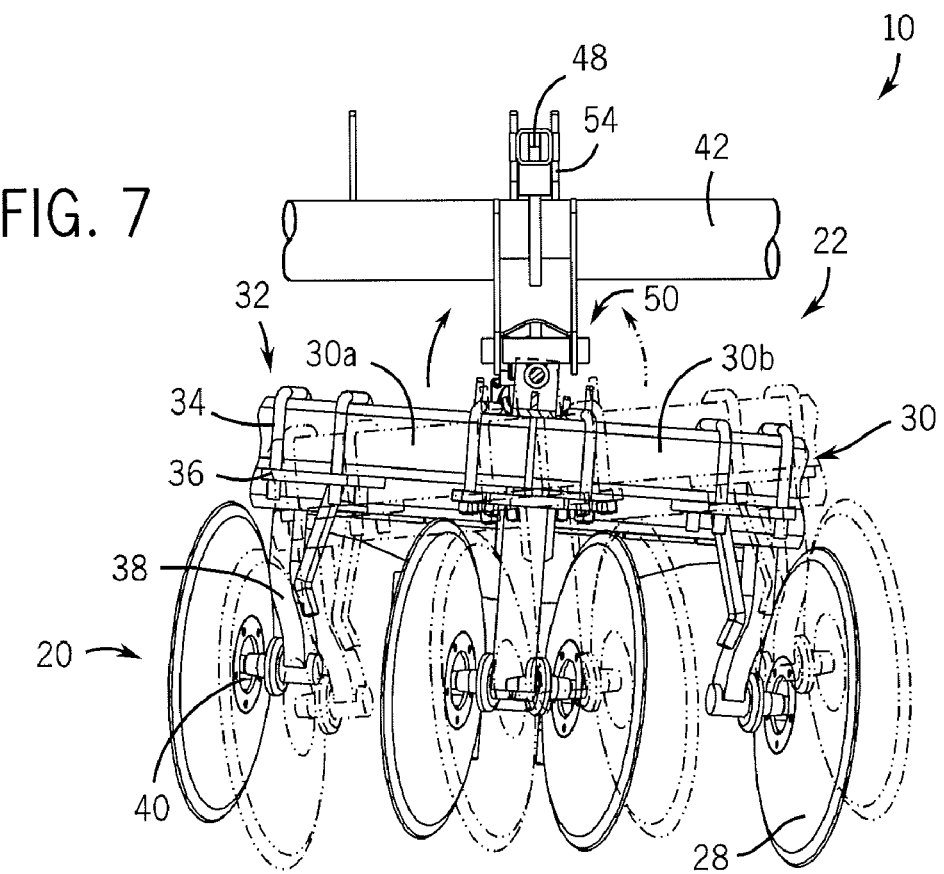
FIG. 7 is a section view similar to FIG. 6 showing oscillation of a disc gang according to one embodiment of the present invention.

It is recognized that the disc harrow 10 may have one or more pivoting mechanisms to assist with obstruction clearing. For example, a pivoting mechanism could be coupled to each of the support beam arms. In another example, when at least two pivoting mechanisms 60 are used, mounted on opposite sides of the subframe 22, the subframe 22 and thus the disc gangs 20, 21 may be caused to oscillate when an obstruction is encountered. More particularly, FIG. 6 shows a front elevation view of a portion of the disc harrow 10 during normal working operation. When an obstruction is encountered of sufficient size to overcome the bias of the cushion of either pivoting mechanism, the disc gangs 20, 21 will oscillate. Thus, the disc gangs will be allowed to move side to side and front to rear when an obstruction of sufficient size is encountered, as illustrated in FIG. 7.

The present invention has been described with respect to a disc harrow, but is understood that the present invention is equivalently applicable with other soil tilling implements. Moreover, the invention may be applicable for a stand-alone disc harrow or a farm implement carrying multiple types of soil tillage tools. For example, cultivating tines may be coupled to the transverse supports 16. Additionally, it is contemplated that the reels 28 of the disc gangs 20, 21 may be of similar size or of dissimilar size. For example, the forward disc gang 20 may have large reels for primary tillage whereas the rearward disc gang 21 may have smaller reels for secondary tillage.

Many changes and will modifications could be made to the invention without departing from the spirit thereof. The scope of these changes will become apparent from the appended claims.

We claim:

1. A disc harrow comprising:
   a mainframe;
   a subframe pivotably coupled to the mainframe;
   a disc gang assembly coupled to the subframe;
   a lever pivotably supported by said mainframe;
   a bracket and hinge arrangement pivotable with respect to said mainframe, the bracket and hinge arrangement having a first end operatively connected to the lever and a second end coupled to the subframe;
   a link spaced along the mainframe from the bracket and hinge arrangement, and having a first end coupled to the mainframe and a second end, wherein the link follows movements of the lever;
   a spring mechanism having a first end pivotably coupled to the second end of the link and a second end coupled to the subframe;
   a pivoting mechanism pivotably coupling the first end of the spring mechanism to the second end of the link, the pivoting mechanism configured to allow the spring mechanism and the disc gang assembly to pivot relative to the mainframe when an obstruction is encountered during harrowing of a farmland;
   an actuator with a first end operatively connected to the lever -and a second end adapted to be mounted to a hitch, said actuator not directly coupled to said spring mechanism and operative to pivot the lever with respect to the mainframe to raise and lower the subframe to a desired depth; and
   wherein the spring mechanism presents an upward and downward- bias on the subframe that must be overcome before the disc gang assembly mounted to the subframe can oscillate.

2. The disc harrow of claim 1 wherein the spring mechanism includes a pair of cushions, spaced from one another and each connected to separate arms of the subframe.

3. The disc harrow of claim 1 wherein the disc gang assembly includes a first disc gang and a second disc gang connected to the first disc gang by a pair of gang braces.

4. The disc harrow of claim 3 wherein the subframe includes a pair of lateral supports, each of which is coupled to a respective gang brace.

5. The disc harrow of claim 3 wherein the subframe includes an I-beam coupling the first disc gang and the second disc gang to one another, the I-beam being positioned centrally between the pair of gang braces.

6. The disc harrow of claim 1 wherein the mainframe includes a pair of rails and a plurality of supports transverse to the pair of rails, wherein the subframe is interconnected with the plurality of supports.

7. A farm implement for tilling a farmland, comprising:
   a mainframe defined by a pair of rails;
   a subframe carrying a harrow and centrally positioned between the pair of rails, -wherein said subframe is pivotably coupled to the mainframe;
   a disc gang assembly coupled to the subframe;
   a lever pivotably supported by -said mainframe ;
   a bracket and hinge arrangement pivotable with respect to said mainframe, the bracket and hinge arrangement having a first end operatively connected to the lever and a second end connected to the subframe
   a link spaced from the bracket and hinge arrangement, and having a first end coupled to the mainframe and having a second end;
   a spring mechanism having a first end coupled to the second end of the link and a second end coupled to the subframe;
   a pivoting mechanism pivotably coupling the second end of the link to the spring mechanism, the spring mechanism presenting a bias on the subframe that must be overcome before the disc gang assembly and the spring mechanism pivot relative to the mainframe when an obstruction is encountered; and
   an actuator with a first end operatively connected to the lever and a second end mounted to a hitch, wherein said actuator is not directly coupled to said spring mechanism and is operable to raise and lower the subframe to a desired position with respect to the mainframe.

8. The farm implement of claim 7 wherein the harrow includes a pair of disc gangs, each of which includes a plurality of crop residue and soil tilling discs, and the pair of disc gangs coupled to one another by an I-beam.

9. The farm implement of claim 8 wherein the pair of disc gangs includes a first disc gang supported by a first disc support beam having a first support arm and a second support arm connected to the first support arm at the I-beam, and further includes a second disc gang supported by a second disc support beam having a third support arm and a fourth support arm connected to the third support arm at the I-beam.

10. The farm implement of claim 9 wherein the first support arm and the second arm are connected to one another so that the first support beam has a V-shape and wherein the third support arm and the fourth support arm are connected to one another so that the second support beam has an inverted V-shape.

11. The farm implement of claim 7 wherein the spring mechanism includes a pair of cushions coupled to the subframe and the mainframe.

* * * * *